US008887060B2

(12) United States Patent
Maity et al.

(10) Patent No.: US 8,887,060 B2
(45) Date of Patent: Nov. 11, 2014

(54) SYSTEM AND METHOD OF WEB-BASED KEYBOARD, VIDEO AND MOUSE (KVM) REDIRECTION AND APPLICATION OF THE SAME

(71) Applicant: American Megatrends, Inc., Norcross, GA (US)

(72) Inventors: Sanjoy Maity, Snellville, GA (US); Baskar Parthiban, Johns Creek, GA (US); Samvinesh Christopher, Suwanee, GA (US); Varadachari Sudan Ayanam, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 141 days.

(21) Appl. No.: 13/839,151

(22) Filed: Mar. 15, 2013

(65) Prior Publication Data

US 2014/0281894 A1   Sep. 18, 2014

(51) Int. Cl.
  *G06F 17/00* (2006.01)
  *G06F 17/22* (2006.01)
(52) U.S. Cl.
  CPC .................................. *G06F 17/2247* (2013.01)
  USPC ........... 715/740; 715/201; 715/771; 709/223; 709/250; 370/392; 370/401
(58) Field of Classification Search
  USPC .................. 715/201, 740, 771; 709/223, 250; 370/392, 401
  See application file for complete search history.

(56) References Cited

U.S. PATENT DOCUMENTS

| | | | | |
|---|---|---|---|---|
| 6,112,264 | A * | 8/2000 | Beasley et al. | 710/38 |
| 6,378,009 | B1 * | 4/2002 | Pinkston et al. | 710/62 |
| 7,945,652 | B2 | 5/2011 | Tsao et al. | |
| 8,136,042 | B2 | 3/2012 | Holovacs et al. | |
| 8,180,826 | B2 | 5/2012 | Hua et al. | |
| 2006/0267936 | A1 * | 11/2006 | Hoerl et al. | 345/158 |
| 2008/0228865 | A1 | 9/2008 | Cruzada | |
| 2009/0106356 | A1 | 4/2009 | Brase et al. | |
| 2011/0066703 | A1 | 3/2011 | Kaplan et al. | |
| 2012/0197966 | A1 | 8/2012 | Wolf et al. | |
| 2012/0306901 | A1 * | 12/2012 | Poddar | 345/545 |
| 2013/0007129 | A1 | 1/2013 | German et al. | |

OTHER PUBLICATIONS

Korean Intellectual Property Office, "International Search Report", published on Dec. 31, 2013, Korea.

* cited by examiner

*Primary Examiner* — Stephen Hong
*Assistant Examiner* — Matthew Ludwig
(74) *Attorney, Agent, or Firm* — Morris Manning & Martin, LLP; Tim Tingkang Xia, Esq.

(57) ABSTRACT

Certain aspects of the present disclosure are directed to a method of performing web-based keyboard, video and mouse (KVM) redirection implemented by a baseboard management controller (BMC). The method includes: (a) receiving, at a BMC, first and second video frames redirected from a host computer, the BMC performing a management function of the host computer, (b) generating a webpage at a web server of the BMC and sending the webpage to a browser program running on a computing device in a network, the webpage being programmed to instruct the browser program to initiate a drawable area and to establish a Web Socket connection with the web server, (c) generating a processed image representing the second video frame, (d) establishing a Web Socket connection between the web server and the browser program, and (e) sending the processed image to the browser program through the Web Socket connection.

25 Claims, 10 Drawing Sheets

US 8,887,060 B2

SYSTEM AND METHOD OF WEB-BASED KEYBOARD, VIDEO AND MOUSE (KVM) REDIRECTION AND APPLICATION OF THE SAME

FIELD

The present disclosure relates to the field of computer systems, and particularly to system and method of web-based keyboard, video and mouse (KVM) redirection between a host computer and a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

A BMC may implement keyboard, video and mouse (KVM) redirection. However, unaddressed needs exist in implementation of KVM redirection

SUMMARY

Certain aspects of the present disclosure are directed to a method of performing web-based keyboard, video, and mouse (KVM) redirection. The method is implemented by a baseboard management controller (BMC). The method includes: (a) receiving, at a BMC, first and second video frames redirected from a host computer, the BMC performing a management function of the host computer, (b) generating a webpage at a web server of the BMC and sending the webpage to a browser program running on a computing device in a network, the webpage being programmed to instruct the browser program to initiate a drawable area and to establish a Web Socket connection with the web server, (c) generating a processed image representing the second video frame, (d) establishing a Web Socket connection between the web server and the browser program, and (e) sending the processed image to the browser program through the Web Socket connection. In certain embodiments, the method includes: (a) comparing, at the BMC, the second video frame with the first video frame to determine a first pixel of the second video frame, the first pixel having a pixel value that differs from a pixel value of a corresponding pixel of the first video frame, (b) generating a first tile image and associated tile parameters, the first tile image representing a portion of the second video frame including the first pixel. In certain embodiments, the method includes sending the first tile image and the tile parameters to the browser program through the Web Socket connection. In certain embodiments, the webpage is programmed to instruct the browser program to patch the first tile image on the drawable area at a position indicated by the tile parameters.

In certain embodiments, the method includes: (a) generating a redirection image representing the first video frame, and (b) sending the redirection image to the browser program through the Web Socket connection, the webpage being programmed to display the redirection image on the drawable area. The drawable area is a canvas defined by HTML 5. The webpage is programmed to instruct the browser program to display the redirection image on the canvas and to patch the first tile image on the displayed redirection image.

In certain embodiments, the method also includes: (a) dividing the second video frame into a plurality of tiles, (b) comparing a pixel value of each pixel in the second video frame with a pixel value of a corresponding pixel in the first video frame, (c) determining a plurality of changed pixels in the second video frame, the pixel value of each of the changed pixels differing from the pixel value of the corresponding pixel of the each changed pixel and in the first video frame, (d) determining a plurality of changed tiles, and each of the changed tiles contains at least one of the changed pixels, (e) generating a plurality of changed tile images, each of the changed tile images representing a respective one of the changed tiles, and (f) sending the plurality of changed tile images to the browser program through the Web Socket connection, the webpage being programmed to instruct the browser program to patch the changed tile images on the drawing area.

In certain embodiments, the method also includes: (a) determining a position of each of the changed tiles on the second video frame, and (b) generating tile parameters for each of the changed tile images based on the position of a respective changed tile represented by the each changed tile image. The webpage is programmed to instruct the browser program to patch the each changed tile image on the drawing area at a position indicated by the tile parameters. The tile parameters include coordinates indicating a position on the drawable area, a width of the each changed tile image, and a height of the each changed tile image. The webpage is programmed to instruct the browser program to capture a first event occurred on the drawable area and to send event data of the first event to the web server, the first event being a mouse event or a keyboard event. The method includes: (a) receiving the event data from the browser program through the Web Socket connection, (b) generating input data compatible with the host computer and representing the event data, and (c) sending the input data to an input controller of the host computer. In certain embodiments, the first event is a mouse event, the event data indicate an event position on the drawable area where the event occurred. The method includes: (a) determining position coordinates of the host computer based on the event position, and (b) generating the input data representing the mouse event and the position coordinates. In certain embodiments, the first event is a keyboard event, the event data indicating a keystroke. The method includes generating the input data representing the keystroke.

In certain embodiments, the method also includes: (a) generating, at the BMC, a predicted value of a given pixel of the second video frame based on pixel values of a plurality of surrounding pixels that surround the given pixel and pixel values of the pixels in the first video frame that correspond to the given pixel and the surrounding pixels, and (b) selectively replacing a pixel value of the given pixel with the predicted value based on a lossy or lossless requirement to generate an encoded image. In certain embodiments, the method further includes compressing the encoded image at the web server to generate the processed image. The webpage is programmed to instruct the browser program to call JavaScript routines to decompress and decode the processed image and to display the decompressed and decoded image at the drawable area.

Certain aspects of the present disclosure are directed to another method of performing web-based keyboard, video, and mouse (KVM) redirection. The method is implemented by a baseboard management controller (BMC), and the method includes: (a) receiving, at a BMC, first and second video frames redirected from a host computer, the BMC performing a management function of the host computer, (b) generating a webpage at a web server of the BMC and sending the webpage to a browser program running on a computing device in a network, (c) generating a processed image representing the second video frame, (d) storing Java objects at the web server, the webpage being programmed to instruct the browser program to download the Java objects, the Java objects defining a Java display, (e) establishing a network connection between the BMC and the Java objects downloaded to and executed on a Java virtual machine at the computing device, and (f) sending the processed image to the executed Java objects.

In certain embodiments, the method also includes: (a) generating, at the BMC, a predicted value of a given of the second video frame pixel based on pixel values of a plurality of surrounding pixels that surround the given pixel and values of the pixels in the first video frame that correspond to the given pixel and the surrounding pixels, and (b) selectively replacing a pixel value of the given pixel with the predicted value based on a lossy or lossless requirement to generate an encoded image. In certain embodiments, the method further includes: (a) compressing the encoded image at the web server to generate the processed image, (b) decompressing and decoding the processed image at the executed Java objects, and (c) displaying the decompressed and decoded image on the Java display.

Certain aspects of the present disclosure are directed to a non-transitory computer storage medium. The non-transitory computer storage medium stores computer-executable instructions. When the instructions are executed by a processor of a baseboard management controller (BMC), the instructions cause the host computer to: (a) receive, at a BMC, first and second video frames redirected from the host computer, the BMC performing a management function of the host computer, (b) generate a webpage at a web server of the BMC and send the webpage to a browser program running on a computing device in a network, the webpage being programmed to instruct the browser program to initiate a drawable area and to establish a Web Socket connection with the web server, (c) generate a processed image representing the second video frame, (d) establish a Web Socket connection between the web server and the browser program, and (e) send the processed image to the browser program through the Web Socket connection.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
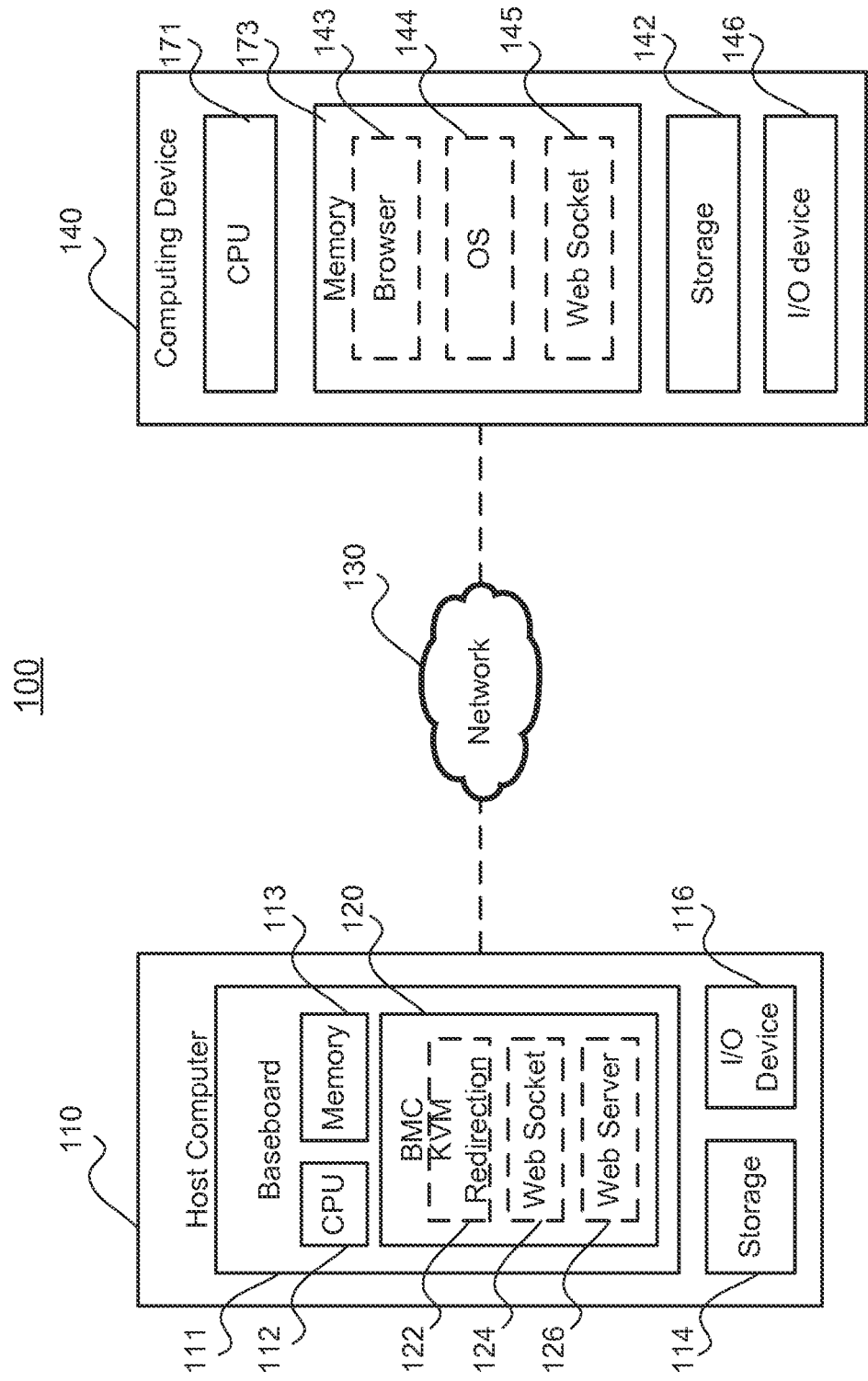
FIG. 1 schematically depicts a web-based KVM redirection system according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout the description.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination of them.

FIG. 1 schematically depicts web-based KVM redirection system according to one embodiment of the present disclosure. As shown in FIG. 1, the system 100 includes a host computer 110 and a computing device 140 connected to the host computer 110 via a network 130. The system 100 can be a system that incorporates more than one interconnected system, such as a client-server network. The network 130 may be a wired or wireless network, and may be of various forms such as a local area network (LAN) or wide area network (WAN) including the Internet.

The host computer 110 may be a general purpose computer system. The host computer 110 includes a baseboard 111, or the "motherboard". The baseboard 111 is a printed circuit board to which a multitude of components or devices may be connected by way of a system bus or other electrical communication paths. Although not explicitly shown in FIG. 1, the components on the baseboard 111 are interconnected, and the layout of the components on the baseboard 111 and the manner of the interconnection between the components on the baseboard 111 is herein referred to as the configuration of the baseboard 111. One of ordinary skill in the art would appreciate that the configuration of the baseboard 111 may be adjusted or changed according to the necessary design or manufacturing requirements.

The components on the baseboard 111 include, but not limited to, a central processing unit (CPU) 112, a memory 113, a baseboard management controller (BMC) 120, and other required memory and Input/Output (I/O) modules (not shown). The CPU 112, the memory 113, and the BMC 120 may be embedded on the baseboard 111, or may be connected to the baseboard 111 through an interface. In certain embodiments, the interface may be physical hardware interface such as electrical connectors, buses, ports, cables, terminals, or other I/O devices.

The CPU 112 is a host processor which is configured to control operation of the host computer 110. The host processor can execute an operating system (OS) or other applications of the host computer 110. In some embodiments, the host computer 110 may have more than one CPU as the host processor, such as two CPUs, four CPUs, eight CPUs, or any suitable number of CPUs.

The memory 113 can be a volatile memory, such as the random-access memory (RAM), for storing the data and information during the operation of the host computer 110.

The BMC 120 refers to a specialized microcontroller that manages the interface between system management software and platform hardware. Different types of sensors can be built into the system 100, and the BMC 120 reads these sensors to obtain parameters such as temperature, cooling fan speeds, power status, OS status, etc. The BMC 120 monitors the sensors and can send alerts to a system administrator via the network if any of the parameters do not stay within preset limits, indicating a potential failure of the system 100. The administrator can also remotely communicate with the BMC 120 to take some corrective action such as resetting or power cycling the system to get a hung OS running again. Further, the BMC 120 can include a KVM redirection module 122, which redirects video and input signals between the computing device 140 and the host computer 110. Thus, a user may initiate a KVM session from the computing device 140 to see the video output of the host computer 110 and to input data to the host computer 110 through input devices of the computing device 140.

In certain embodiments, firmware of the BMC 120 adheres to the Intelligent Platform Management Interface (IPMI) industry standard for system monitoring and event recovery. The IPMI protocol is a standardized computer system interface protocol for out-of-band management of computer systems and monitoring of the operation, which is session-based, requiring an IPMI session be established between the application module and the target IPMI device before the application module can communicate with the target IPMI device. The IPMI specification provides a common message-based interface for accessing all of the manageable features in a compatible computer, and includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. The BMC can receive IPMI instructions or requests from a locally connected management computer through a system interface, or as external requests through a network interface.

In certain embodiments, the BMC 120 includes, among other things, a KVM redirection module 122, a Web Socket module 124 and a web server module 126. The KVM module 122 implements KVM redirection functionalities. The Web Socket module 124 can establish full-duplex communications channels under the Web Socket protocol over a single transmission connection protocol (TCP) connection. The web server module 126 can provide web contents accessible through the Internet. Details of the modules will be described later.

Further, the host computer 110 includes a storage 114, which is a data storage media for storing the OS (not shown) and other applications of the host computer 110, and at least one I/O device 116. Examples of the storage 114 may include flash memory, memory cards, USB drives, hard drives, floppy disks, optical drives, or any other types of data storage devices. Examples of the I/O device 116 include keyboards, touch pads, mouse, microphones, display screens, touch screens, or other I/O devices applicable for the host computer 110.

A computing device 140 is remotely connected to the host computer 110 via the network 130. One of ordinary skill in the art would appreciate that the system 100 may include multiple computing devices 140 simultaneously remotely connected to the host computer 110. Examples of the computing device 140 may include, for example, portable devices such as smartphones, tablets or other mobile computer devices.

The computing device 140 includes a CPU 171, a memory 173, and storage 142. The storage 142 is a data storage media for storing the OS and other applications of the computing device 140. Examples of the storage 142 of the computing device 140 may include flash memory, memory cards, USB drives, hard drives, floppy disks, optical drive, or any other types of data storage devices.

A browser program 143 can be loaded in the memory 173 and executed by the CPU 171 of the computing device 140. The browser program 143 is a software application for retrieving, presenting and traversing information resources to the user. Further, the browser program 143 can serve as a KVM redirection client of the system 100 for communicating with the BMC 120. Generally, the browser program 143 may retrieve the information resources provided on an open network, such as the Internet. The information resources may include web page, image, video or other types of data contents.

Further, the memory 173 can load an OS 144 and a Web Socket module 145. The Web Socket module 145 is a module corresponding to the Web Socket module 124 of the BMC 120 on the host computer 110, such that the full-duplex communications channels under the Web Socket protocol may be established between the BMC 120 and the computing device 140.

Further, the computing device 140 has at least one I/O device 146. Examples of the I/O device 146 include keyboards, touch pads, mouse, microphones, display screens, touch screens, or other I/O devices applicable for the computing device 140. Some I/O devices, such as touch screens, are provided for the dual input/output purposes for the computing device 140.

For displaying the information resources such as the web pages and other data contents using the browser program 143, HyperText Markup Language (HTML) is a standardized markup language in a web-based language format for displaying the web pages and other information that can be displayed in the browser program 143. Data in the HTML format is written in the form of HTML elements, or "tags", which are enclosed in angle brackets (such as <html>), within the web page contents. Currently, the HTML format is widely adopted by almost all of the browser programs on the market, and is thus suitable as the web-based language format of the communicating instructions between the browser program 143 on the computing device 140 side and the web server 126 of the BMC 120 on the host computer 110 side.

Generally, a scripting language such as JavaScript is used in addition to the HTML format language to control input and output of the user interface. Further, HTML5, which is the currently developing revision of the HTML language, provides extensive features for web storage, which utilizes web application software methods and protocols used for storing data through a web browser. Older common used browser programs do not support the HTML5 format, but the browser programs supporting the HTML5 format include MOZILLA FIREFOX 1.5, GOOGLE CHROME 4.0, SAFARI 3.1, SAFARI MOBILE 3.2, OPERA 9.0, OPERA MOBILE 10.0, ANDROID BROWSER 2.1, AND INTERNET EXPLORER 9.0, or any newer version of these browser programs. Thus, the browser program 143 can support HTML5 and can be one of the browser programs listed above.

The browser program 143 can communicate with the web server 126 at the BMC using the Hypertext Transfer Protocol (HTTP). Specifically, the browser program 143 may send an HTTP request to the web server 126. Upon receiving the HTTP request, the server sends an HTTP response in response to the HTTP request to the browser program.

The web server 126 typically cannot initiate a data transmission to the browser program 143 under HTTP. Web Socket can provide full-duplex communications channels over a single TCP connection such that the server may actively send instruction or information to the client. Web Socket is incorporated into HTML5, and thus is supported by web browsers and servers implementing HTML5.

Figure 2:
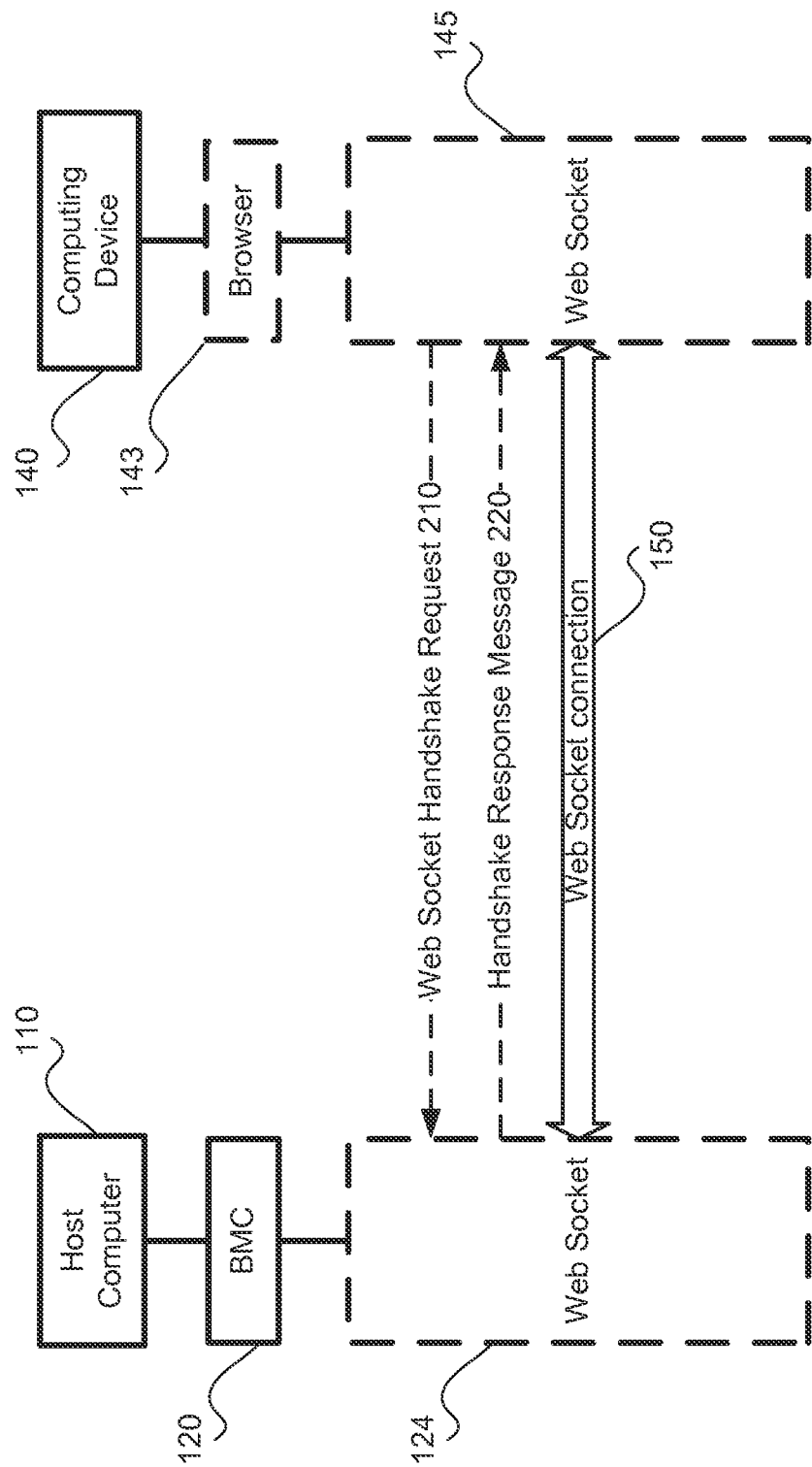
FIG. 2 schematically depicts a Web Socket connection according to one embodiment of the present disclosure.

FIG. 2 shows the process of establishing the Web Socket connection between the host computer 110 and the computing device 140 according to one embodiment of the disclosure. The Web Socket connection starts in a similar way to the HTTP connection, but provides continuous two-way web-based connection between the host computer 110 and the browser program 124. When the browser program 143 attempts to establish a Web Socket connection, the browser program 143 instructs the Web Socket module 145 to send a Web Socket handshake request to port 80 (the default HTTP port) or port 443 (the HTTPS port) of the Web Socket module 124 of the BMC 120. The Web Socket handshake request resembles the GET command used in the HTTP request, but includes more Web Socket instructions and can be seen as an "upgraded" request. Upon receiving the Web Socket handshake request, the web server 126 can identify the request as the Web Socket handshake request and not an HTTP request according to the upgraded information in the Web Socket handshake request. The web server 126 sends a handshake response message to the browser program 143. Accordingly, a Web Socket connection 150 can be established between the browser program 143 and the web server 126.

Figure 3A:
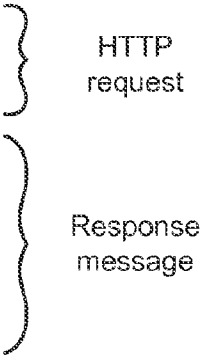
FIG. 3A depicts an example of an HTTP request using the GET command and an HTTP response.
Figure 3B:
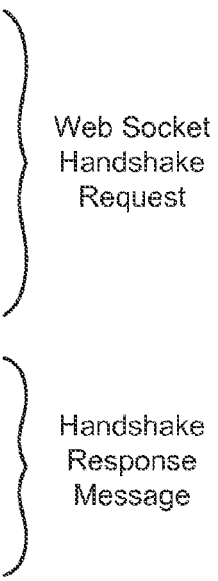
FIG. 3B depicts examples of Web Socket handshake request and response according to one embodiment of the present disclosure.

FIGS. 3A and 3B provide a comparison between the Web Socket handshake request and the HTTP request, where FIG. 3A shows an example of the HTTP request using the GET command, and FIG. 3B shows an example of the Web Socket handshake request. As shown in FIG. 3A, the header portion of the response message to the HTTP request indicates information of the contents in the response message, include the type of content being text/html files, the length of the content file, and the language used in the content. The last line of the header portion of the response message to the HTTP request indicating that the connection between the host computer 110 and the browser program 124 is closed at the end of the response. In comparison, the first two lines of the Web Socket handshake request as shown in FIG. 3B include the same GET instructions as the HTTP request. The following lines of the Web Socket handshake request include the upgraded information, informing the Web Socket module 124 to upgrade, or to switch from the regular HTTP request to the Web Socket protocol. Further, unlike the response message to the HTTP request, the header portion of the handshake response message to the Web Socket handshake request does not indicate that the connection is closed at the end of the response.

Once the Web Socket connection 150 is set up, both the Web Socket module 124 and the Web Socket module 145 can send data over the connection to the other end. The data format can be in any valid UTF-8 string format, such as JSON or XML, but other data format may be used if desired.

The Web Socket modules 124 and 145 can be of various types and designs, such as PHP Web Sockets, Java jWeb Socket, Web-Socket-ruby, Socket IO-node, or other types of Web Socket applications. To set up the Web Socket module 124 as a Web Socket server on the host computer 110 side, the domain name or the IP address of the host computer 110 and the port used (such as port 80 or port 443) must be provided to indicate the location of the host computer 110, and a plurality of instructions must be set up in response to certain "events" such as opening a socket (i.e. a Web Socket connection), receiving the handshake request and other messages in the socket, or closing a socket. When the Web Socket server is set up, a Web Socket client may connect to the Web Socket server using the uniform resource locator (URL) starting with the scheme "ws" instead of the regular HTTP scheme "http", or the scheme "wss" instead of the regular HTTPS scheme "https".

Figure 4:
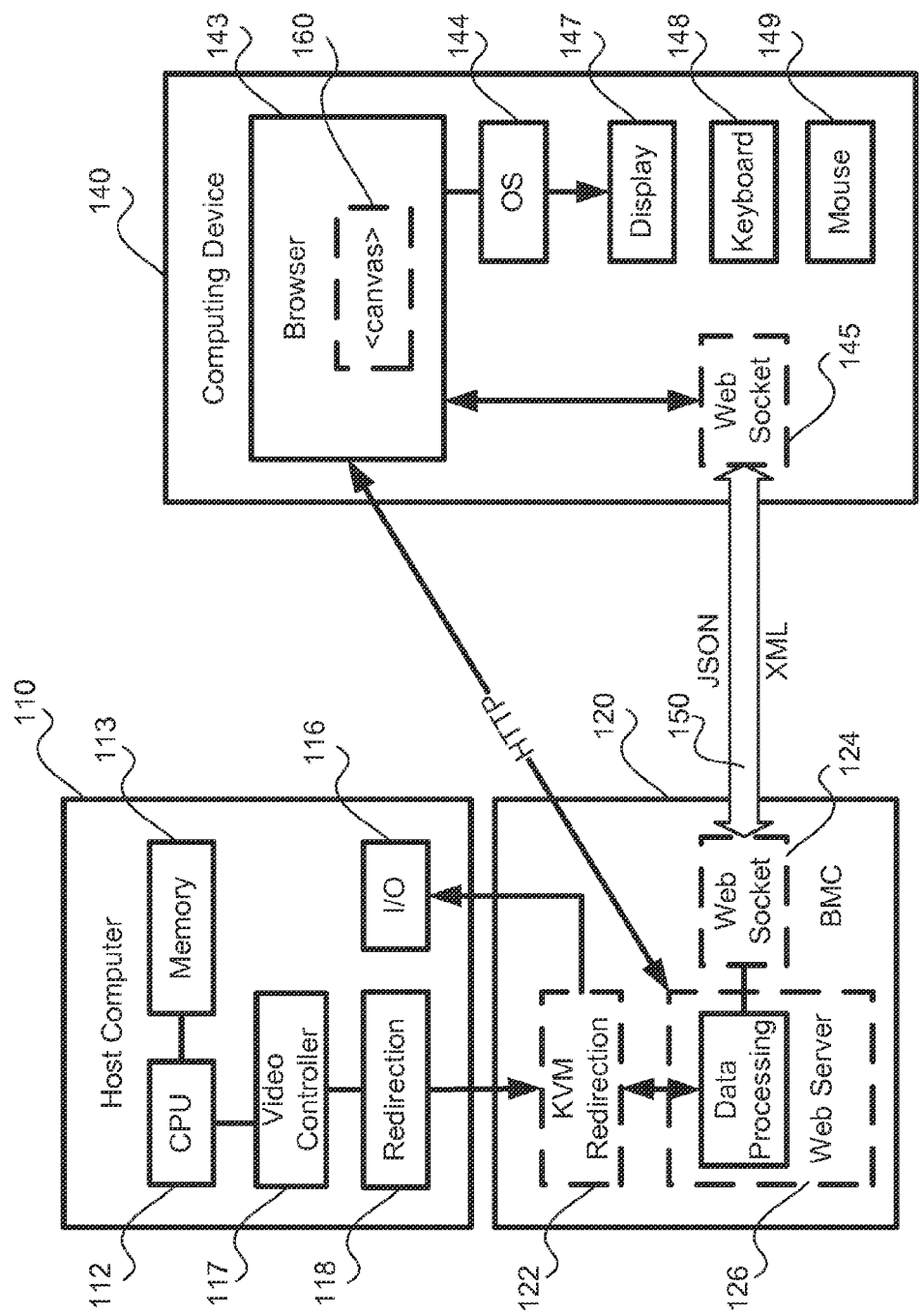
FIG. 4 schematically depicts a web-based KVM redirection according to one embodiment of the present disclosure.

FIG. 4 schematically depicts the web-based KVM redirection according to one embodiment of the present disclosure. As shown in FIG. 4, a Web Socket connection 150 is established between the BMC and the computing device 140. The host computer 110 may include a video controller 117 that output video signals, and a redirection controller 118 as the I/O port for the video redirection. The KVM redirection module 122 of the BMC 120 in this embodiment is connected to the redirection controller 118 and the I/O controller 116. The KVM redirection module can receive redirected video frames from the redirection controller and send keyboard and mouse input signals to the I/O controller 116.

The computing device 140 includes a display device 147 and input devices such as a keyboard 148, a mouse 149, and a touch panel. Although not explicitly shown, the host computer 110 and the computing device 140 may include other elements to perform the web-based KVM redirection.

Figure 5:
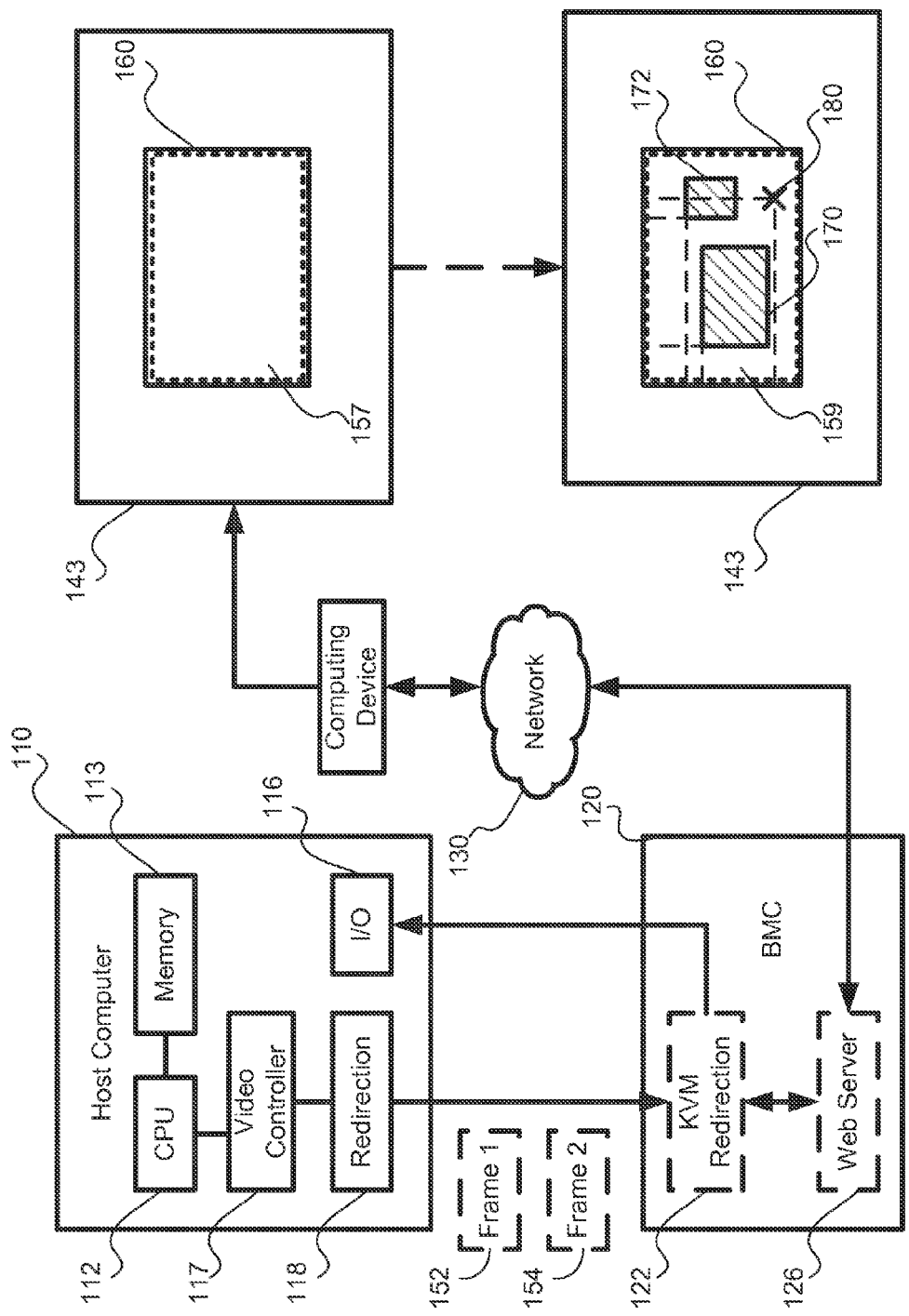
FIG. 5 schematically depicts a web-based video redirection to one embodiment of the present disclosure.

FIG. 5 schematically depicts a web-based KVM redirection according to certain embodiments of the present disclosure. As shown, the host computer 110 has a video controller 117, which outputs video signals. For example, the video signals can be output to a display device for display. The video controller 117 is in communication with a redirection controller 118, which captures the video signals and generates video frames. The redirection controller subsequently sends the video frames to the KVM redirection module 122 of the BMC 120.

For example, the KVM redirection module 122 receives the video frames 152 and 154 from the host computer, processes the video frames, to generate redirection images, and sends the redirection images to the web server. The web server, upon request from a browser running on the computing device 140, sends a KVM redirection webpage to the browser. The browser, under the instruction of the webpage, can retrieve the redirection images from the web server.

In certain embodiments, the web server is configured to generate a KVM redirection webpage utilizing canvas supported by HTML5. The redirection webpage contains canvas tags that define a drawable region of the browser display page. The canvas tag is one of the elements provided by the HTML5 for processing image and video files, allowing dynamic, scriptable rendering of shapes and bitmap images. The canvas tag defines the height and width attributes of the drawable region. A JavaScript code may access the drawable region through a full set of drawing functions, and display dynamically generated images on the drawable region defined by the canvas tag. The canvas tag has no drawing abilities of its own, and can be seen as a container of the images. Generally, the canvas tag has an ID that can be referenced by the JavaScript code. FIG. 5 shows the KVM redirection page rendered by the browser program 143 has a canvas 160.

Based on the configuration information input by a user, or alternatively a default configuration, the web server can set the size of the canvas in the KVM redirection web page. For example, the user may desire to have the same resolution as the resolution of video frames output by the video controller. In other words, each pixel of the video frame output by the video controller has a respective corresponding pixel on the canvas. For example, if the video resolution of the video frame is 1024*768, the canvas defined by the canvas tag may accordingly have a width of 1024 and a height of 768. As another example, the user may desire to have half of the resolution of the video frame. Thus, if the video resolution of the video frame is 1024*768, the canvas defined by the canvas tag may have a width of 512 and a height of 384. The below description, in general, uses a one-to-one corresponding relationship between the resolution of the video frame and the resolution of the canvas as an example. One skilled in the art should appreciate that the techniques discussed below similarly apply to canvas having resolution according to other corresponding relationship to the resolution of the video frame.

The KVM redirection module 122 receives the first and second video frames 152, 154 from the redirection controller 118 of the host computer 110. When of the first frame 152 is the initial frame received by the KVM redirection module, i.e. no previous video frames has been received by the KVM redirection module 122, the KVM redirection module generates a first redirection image 157 having information of all the pixels in the first frame 152 and sends the first redirection image 157 to the web server 126. The redirection image is in a format that can be rendered by the browser program 143. The web server 126 then sends the first redirection image 157 to the browser program using the techniques described below.

After receiving the second video frame 154, the KVM redirection module 122 compares the second frame 154 with a copy of the first frame 152 kept in the KVM redirection module 122 and detects if any corresponding pixels in the first and second frames have different values. When a difference is detected, the KVM redirection module 122 generates a patch containing the pixel information of the pixels in the second frame 154 that are different from the corresponding pixels in the first frame 152, and send the patch to the web server. As will be described in detail below, the web server 126 sends the patch to the browser program 143 on the computing device 140, and accordingly the browser program 143 can patch the canvas at the corresponding areas 170, 172.

Figure 6:
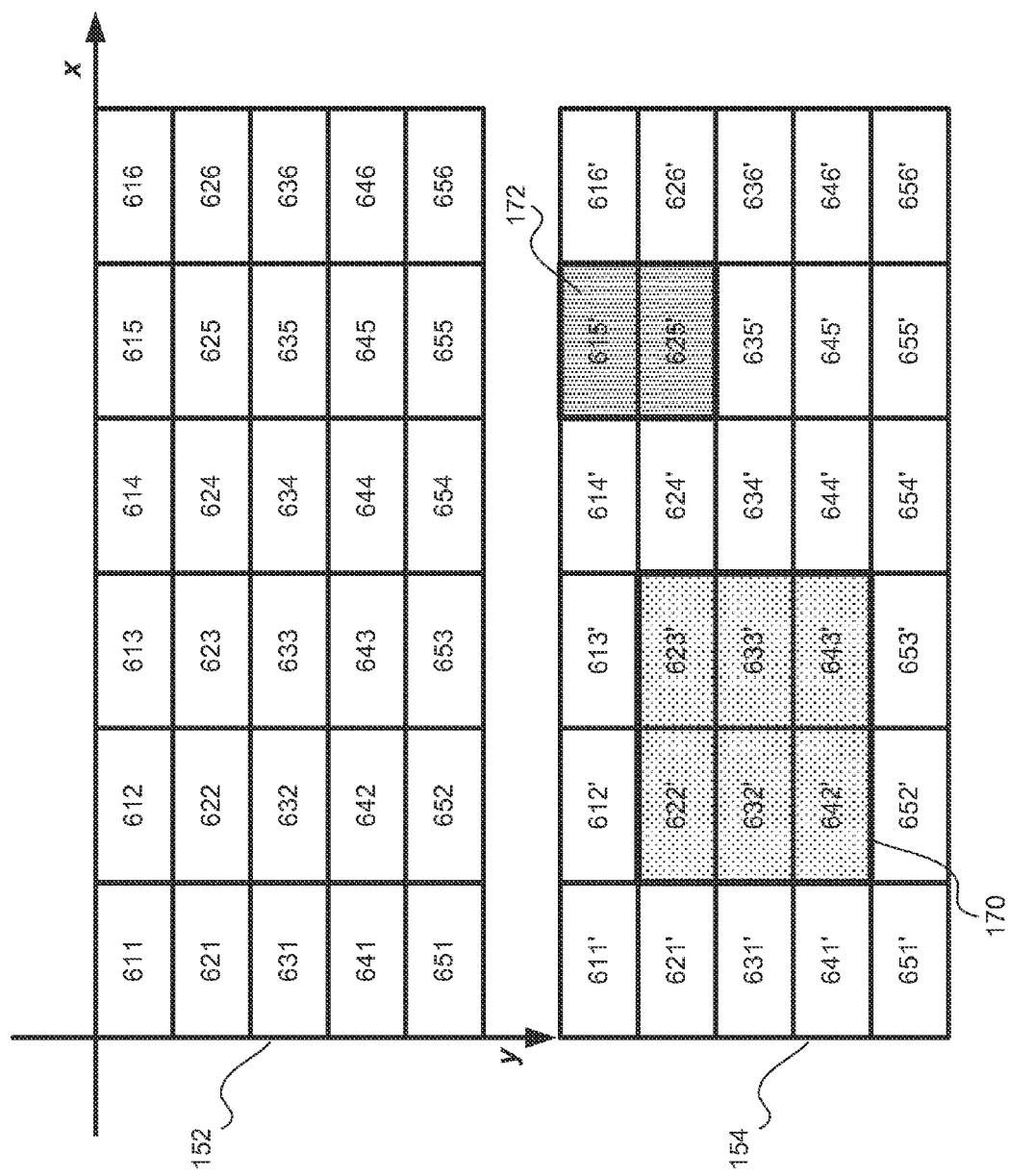
FIG. 6 schematically depicts video frames and tiles according to one embodiment of the present disclosure.

FIG. 6 shows the first and second video frames 152, 154. In this example, the KVM redirection module 122 divides each of the video frames 30 tiles, which constitute 5 rows and 6 columns in a matrix form. The number of tiles is configurable. For example, the default tile configuration can be a 16*16 matrix. The KVM redirection module 122 compares the pixel values of the first and second video frames pixel by pixel. In other words, the KVM redirection module 122 determines whether the value of any pixel of the second video frame is different from the value of a corresponding pixel of the first video frame. If any pixel in a tile of the second video frame 154 has changed from the corresponding pixel of the first image frame 152, the KVM redirection module 122 determines that tile has changed. For example, as shown in FIG. 6, the tiles 615', 625', 622', 623', 632', 633', 642' and 643' of the second frame have changed comparing to the first frame 152. The KVM redirection module 122 accordingly only sends pixel values of the tiles 622', 623', 632', 633', 642', 643', 615', and 625' as tile images, as well as the tile parameters to the web server 126. The tile positions are indicated by the coordinates on the video frame, which are included in the tile parameters. The position of a tile is typically defined as the position (e.g. the coordinates) of the upper left corner of the tile.

The web server 126 receives tile coordinates as part of the tile parameters, and then determines whether it needs to convert the video frame coordinates of the tile images to browser coordinates in order for the browser program to correctly patch the redirection image currently being rendered. For example, the tile parameters received by the web server can be (x, y, W, H), indicating that the position of a tile is at coordinates (x, y) on the video frame and that the tile has a width of W and a height of H. The width and height parameters are optional.

When the resolution of the canvas is configured to have a one-to-one relationship with the resolution of the video frame, i.e., each pixel of the video frame has a respective corresponding pixel on the canvas, the web server 126 can determine that the tile parameters (x, y, W, H) can also be directly used by the canvas without conversion to patch the tiles on the canvas. The web server can convert the tile images received from the KVM redirection module 122 to a different format that can be rendered by the browser program 143. The tile images can be in various image or graphic file format, such as the commonly used JPEG, PNG or BMP formats, or other image file formats displayable by the browser program 143. The web server 126 then sends the tile images with the tile parameters to the browser program 143 as will be described below. The browser program 143 accordingly patches the canvas using the tile images at the areas indicated by the tile parameters. For example, the redirection webpage generated by the web server can have JavaScript code such as context.drawImage (tile, x, y, W, H) that instructs the browser to patch the tile images on the canvas. When the resolution of the canvas is configured to have another ratio (e.g., 1:2) relative to the resolution of the video frame, the web server 126 can convert the video frame coordinates to browser coordinates (e.g. x/2, y/2, W/2, H/2) in accordance with that ratio. FIG. 5 illustrates that the browser program 143 initially displays a first redirection image 157 on the canvas 160. After the BMC 120 sends a patch including one or more tiles 170, 172 to the browser program 143, the browser program 143 then patches the first redirection image 157 to generate a second redirection image 159.

The web server 126 can send the tile images to the browser program 143 in various ways. For example, the web server 126 can store the tile images and the tile parameters at a predetermined location of the web server. The redirection webpage generated by the web server 126 can instruct the browser program 143 to periodically check that predetermined location to determine if new patches are available. Alternatively, the redirection webpage can instruct the browser program 143 to establish a Web Socket connection with the web server, and then the web server can send the tile images with the tile parameters to the browser program 143 through the web socket connection.

In certain embodiments, the tile images can be in various formats such as PNG, BMP, JPEG, etc. The web server 126 can identify each tile of the video frame by an identifier such as a number or a letter. The web server 126 can send a tile image and its identifier to the browser program 143 through the Web Socket connection 150. For example, the web server 126 can send tile image #5 to the browser program 143. The canvas 160 on the browser program 143 can also be divided into tiles corresponding to the tiles of the video frame. In other words, each tile identifier can also identify a single tile on the canvas 160. The redirection webpage rendered by the browser program 143 accordingly has JavaScript routines that can draw the received tile images at the tile areas on the canvas 160 identified by the identifier. For example, the canvas can have a specific area that is identified as tile #5. After receiving the tile image #5, the redirection webpage accordingly instructs the browser program to draw the tile image (e.g., in PNG, JPEG, or BMP format) at the area identified as #5 on the canvas.

Figure 7A:
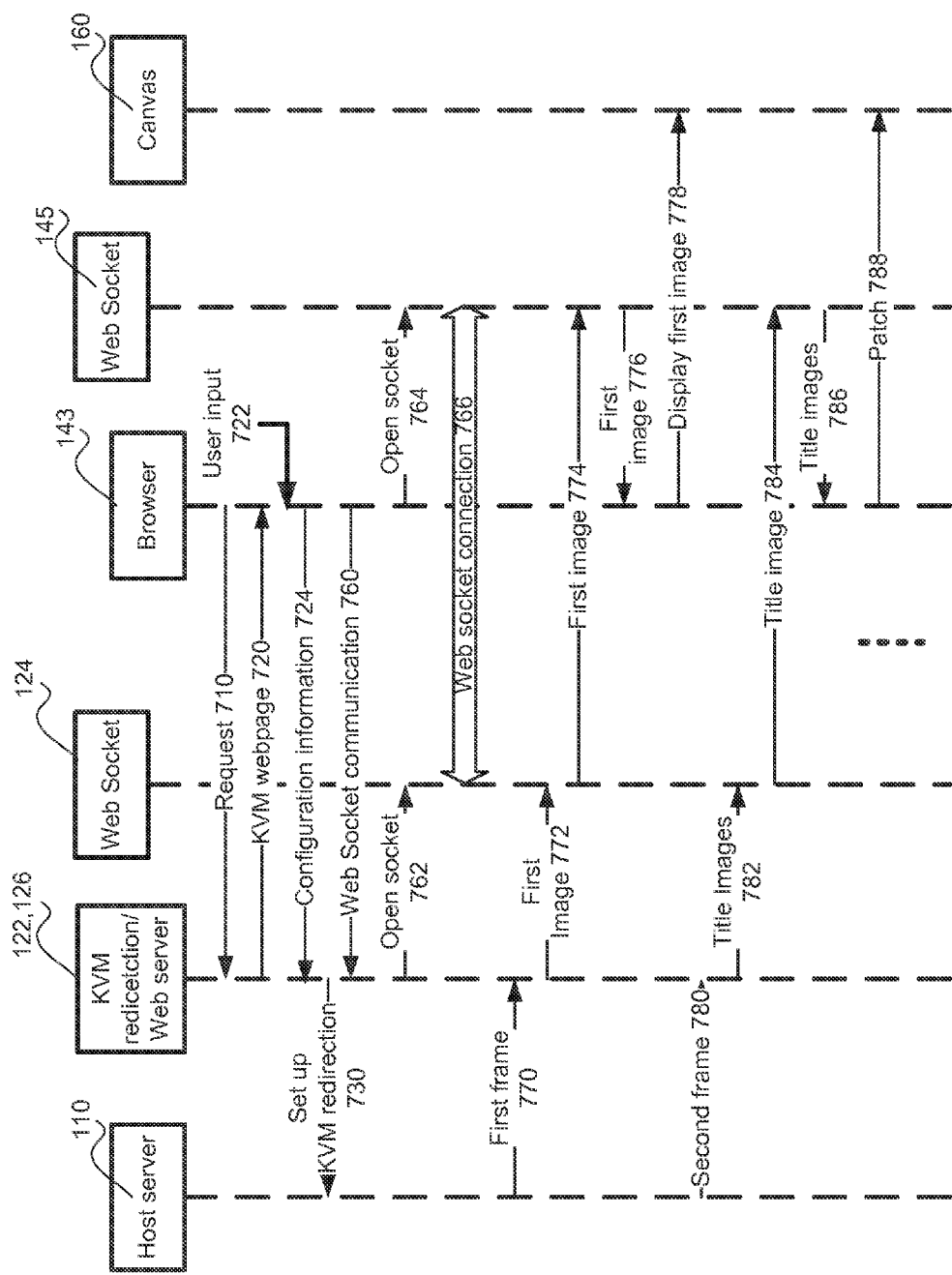
FIG. 7A schematically depicts a process of a video redirection according to one embodiment of the present disclosure.

FIG. 7A illustrates procedures for video redirection utilizing a Web Socket connection and HTML5 canvas in accordance with certain embodiments of the present disclosure. At operation 710, the browser program 143 sends a request to the BMC 120 for a KVM redirection webpage via the network 130. The request may be in the HTTP format. Upon receiving the request for the KVM redirection webpage, at operation 720, the web server 126 of the BMC 120 sends the KVM redirection webpage to the browser program 143. Thus, the browser program 143 may display the KVM redirection webpage to a user, allowing the user of the computing device 140 to input or select the configuration information for the KVM redirection module 122 of the BMC 120 at operation 722. The configuration information of the KVM redirection module may include redirection image resolution information, redirection image refreshing rate information, machine and network settings, authentication settings, and the other information for the KVM redirection. Then, at operation 724, the browser program 143 sends the configuration information, for example using HTTP protocol, to the web server 126 of the BMC 120. Upon receiving the configuration information, the web server 126 accordingly sends the configuration information to the KVM redirection module. At operation 730, the BMC 120 sets up the KVM redirection module 122 accordingly. The KVM redirection module can establish a connection with the redirection controller 118 of the host computer 110.

At operation 760, the browser program 143 sends a Web Socket handshake request to the web server 126 for establishing the full-duplex communication under the Web Socket protocol. Upon receiving the Web Socket handshake request, at operation 762, the web server 126 instructs the Web Socket module 124 to open a web socket. Similarly, at operation 764, the browser program 143 instructs the Web Socket module 145 to open a web socket. Thus, at operation 766, a Web Socket connection is established between the Web Socket module 124 and the Web Socket module 145.

Once the Web Socket connection is established, the BMC 120 may start redirecting video output from the host computer 110 to the browser program 143 through the Web Socket connection. Specifically, at operation 770, the KVM redirection module receives the first video frame from the host computer 110. The KVM redirection module then processes the first video frame to generate a first redirection image, and sends the first redirection image to the web server 126. At operation 772, the web server 126 sends the first redirection image to the Web Socket module 124. At operation 774, the Web Socket module 124 sends the first redirection image to the Web Socket module 145 of the computing device through the Web Socket connection. At operation 776, the Web Socket module 145 sends the first redirection image to the browser program 143. The browser program 143 can then, as instructed by the redirection webpage, display the first redirection image on the canvas 160 at operation 778.

Subsequently, at operation 780, the KVM redirection module 122 receives a second video frame from the host computer 110. The KVM redirection module 122 then compares the second video frame with the first video frame to determine if any pixel of the second video frame has a value that is different from the value of a corresponding pixel in the first video frame. If any of the pixels in the second video frame is changed, the KVM redirection module 122 generates one or more tile images and the associated tile parameters accordingly. The KVM redirection module 122 sends the tile images and the tile parameters to the web server 126. The web server then, if necessary, converts the tile images to a format supported by the browser program 143. At operation 782, the web server 126 of the BMC 120 sends the tile images and parameters to the Web Socket module 124. At operation 784, the Web Socket module 124 sends the tile images and parameters to the Web Socket module 145 through the Web Socket connection. At operation 786, the Web Socket module 145 sends the tile images and parameters to the browser program 143. The browser program 143 can, as instructed by the KVM redirection webpage, patch the first redirection image on the canvas with the received tile images at the areas indicated by the tile parameters at operation 788.

Figure 7B:
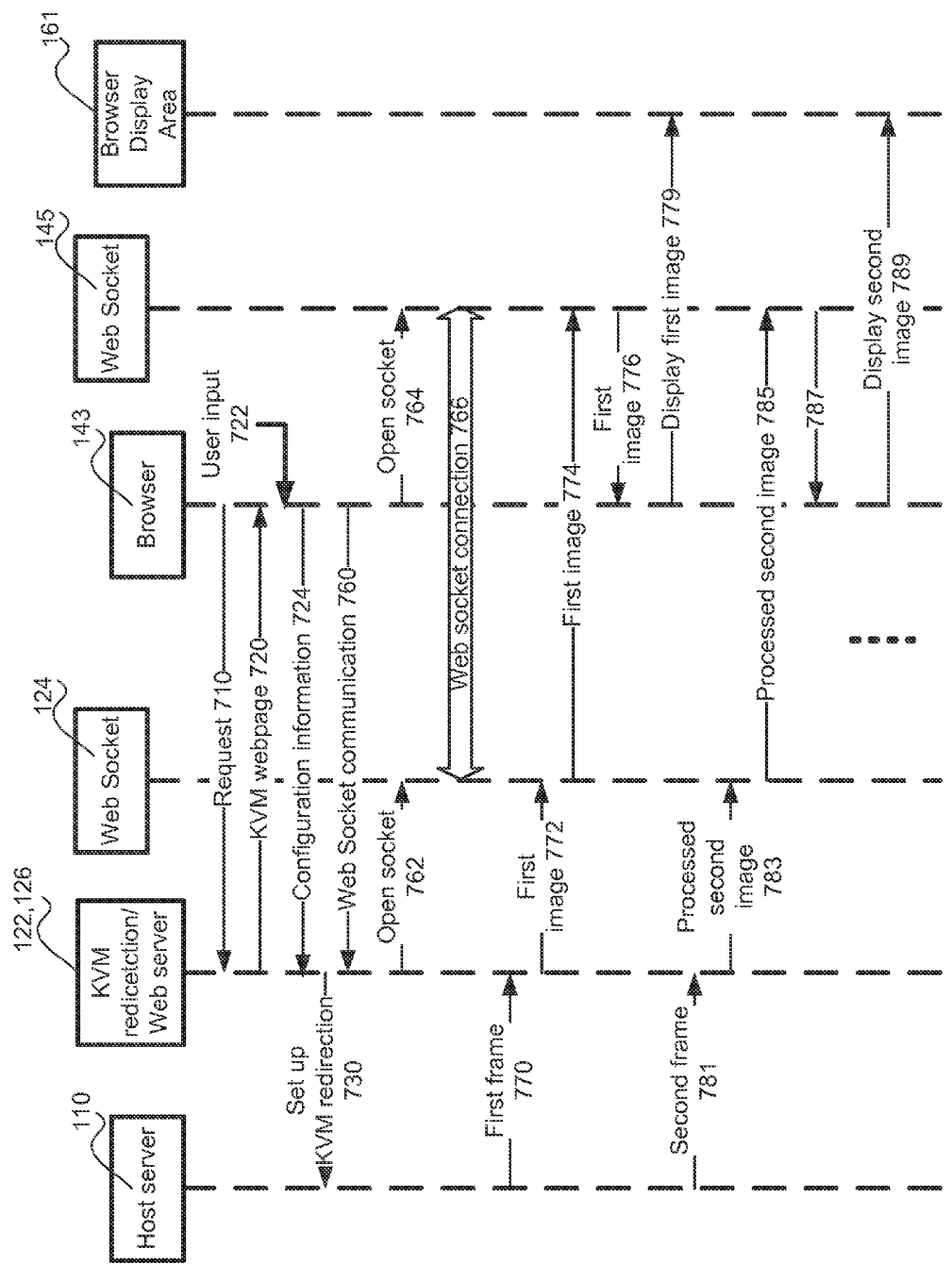
FIG. 7B schematically depicts a process of a video redirection according to another embodiment of the present disclosure.

FIG. 7B illustrates procedures for video redirection utilizing a Web Socket connection 150 and certain image processing techniques in accordance with certain embodiments of the present disclosure. In this example, the KVM redirection module 122 initially forwards the first redirection image representing the first frame to the browser program 143. The browser program can accordingly display the first redirection image at a display area 161 of the browser program 143. Then, the KVM redirection module 122 can use various encoding and compression techniques to process the second redirection image representing the second frame 154. The processed (i.e., encoded and compressed) second redirection image is then transmitted to the browser program 143 through the Web Socket connection 150. The redirection webpage received by the browser program 143 contains JavaScript routines that can be utilized to instruct the browser program 143 to decompress and decode the processed second redirection image. After the browser program 143 decompress and decode the processed second redirection image to obtain an image for display, it can display that image at the display area of the browser program 143, One of the processing (i.e., encoding/decoding and compression/decompression) techniques is disclosed in U.S. Pat. Nos. 7,567,717 and 7,970,218, which are explicitly incorporated herein by reference. Briefly, the KVM redirection module 122 can generate, as disclosed in those patents, a predicted value for a given pixel of the second redirection image based on the values of the several pixels surrounding the given pixel in the second redirection image and the values of the corresponding pixels in the first redirection image. Further, the KVM redirection module 122 selectively replaces the actual value of the given pixel in the second redirection image with the predicted value in accordance with a lossy or lossless requirement, and then encodes the second redirection image accordingly. Subsequently, the KVM redirection module 122 uses a predetermined algorithm, e.g., simplified run length encoded ("RLE") algorithm, to compress the encoded second redirection image, thus obtaining the processed second redirection image. In addition or alternatively, the KVM redirection module 122 can process the second redirection image using some commonly used image compression techniques including lossless image compression methods, such as DPCM, entropy encoding, deflation or chain code compression, and lossy image compression methods, such as color space reduction, subsampling, or transform coding.

Specifically, the operations 710 to 776 shown in FIG. 7B are similar to the corresponding operations shown in FIG. 7A. At operation 779, the browser program 143 displays the first redirection image at a browser display area 161 of the browser program 143. At operation 781, the KVM redirection module 122 receives a second video frame from the host computer 110 and generates a second redirection image. The KVM redirection module 122 then processes the second redirection image using the techniques discussed above to generate a processed (i.e., encoded and compressed) image. At operation 783, the web server 126 of the BMC 120 sends the processed image to the Web Socket module 124. At operation 784, the Web Socket module 124 sends the processed image through the Web Socket connection 150 to the Web Socket module 145. At operation 787, the Web Socket module 145 sends the processed image to the browser program 143. At operation 78, the browser program 143 can, for example as instructed by the JavaScript routines defined in the redirection webpage, decompress and decode the processed image to obtain an image for display, and then display the image at the display area 161.

Figure 8:
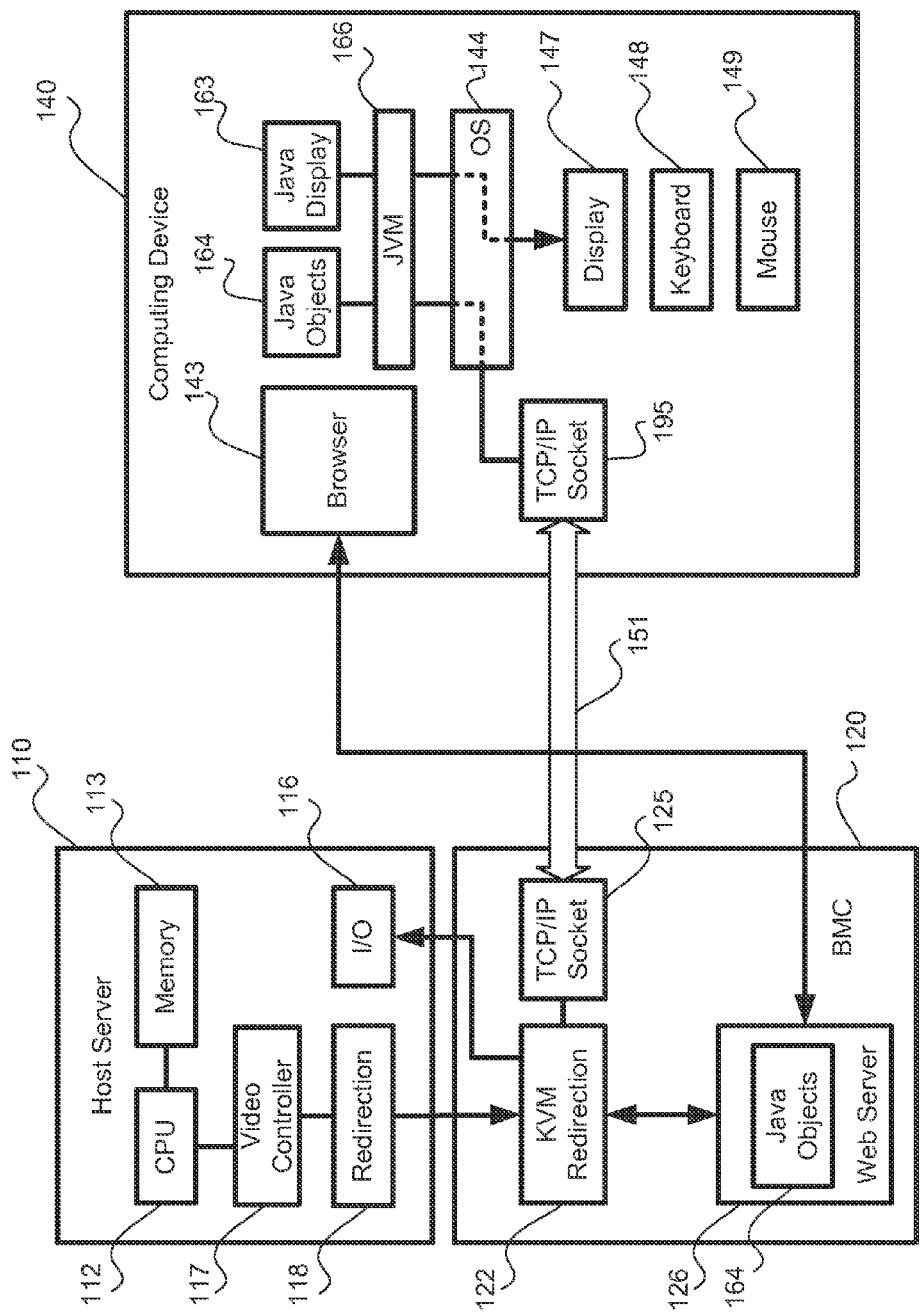
FIG. 8 schematically depicts a web-based video redirection according to another embodiment of the present disclosure.

FIG. 8 schematically depicts a web-based KVM redirection according to another embodiment of the present disclosure. In this embodiment, the computing device 140 includes a Java virtual machine (JVM) 166. Alternatively, the JVM can be downloaded from the web server 126 of the BMC 120 by the browser program 143.

Initially, the browser program 143 connects with the web server 126 at the BMC 120 to receive a redirection webpage. A user can input authentication information and send the authentication information to the web server through the redirection webpage. The web server 126 authenticates the user and then sends a session token to the browser program 143. The web server 126 stores precompiled Java objects 164, which can be executed by the JVM on the computing device 140. The browser program 143 downloads the Java objects 164 with permission of the user operating the browser program. The Java objects 164 are then executed at the JVM of the computing device 140. The Java objects initiate a Java display module 163 that can be used to display redirection images and patches. The Java display module 163 renders the images on the display device 147. The browser program 143 passes the session token received from the web server 126 to the Java objects 164. The Java objects 164 can establish a connection 151 with the redirection server 122. Typically the connection 151 is established between a TCP/IP socket 195 at the computing device 140 and a TCP/IP socket 125 at the BMC 120. The Java objects 164, through the JVM 166, can instruct the operating system 144 to open the TCP/IP socket 195 for the Java objects 164. Using the session token, the Java objects 164 can establish a communication channel for the session with the KVM redirection module 122.

After the communication channel is established, the KVM redirection module 122 can send redirection images and patches to the Java objects through the communication channel. The Java objects 164 calls the Java display module 163 to display the redirection images and patches. In accordance with the user's configuration for required resolution of the redirection image, the Java objects 164 sets the Java display module 163 to the desired resolution. The Java objects 164 can define a function such as drawImage( ) that can be called to display a full redirection image at the Java display module 163 and to patch the Java display module 163 with tile images at indicated areas. Similar to the canvas 160, the Java objects 164 can use coordinate parameters to draw the tiles images on the Java display module 163.

Alternatively, the KVM redirection module 122 can process the redirection images as described above with respect to FIG. 7B. Then the KVM redirection module 122 sends the processed image to the Java objects 164 through the communication channel. The Java objects 164 can decompress and decode the processed image to obtain an image for display. Then, the Java objects 164 can display the image on the Java display module 163.

Figure 9:
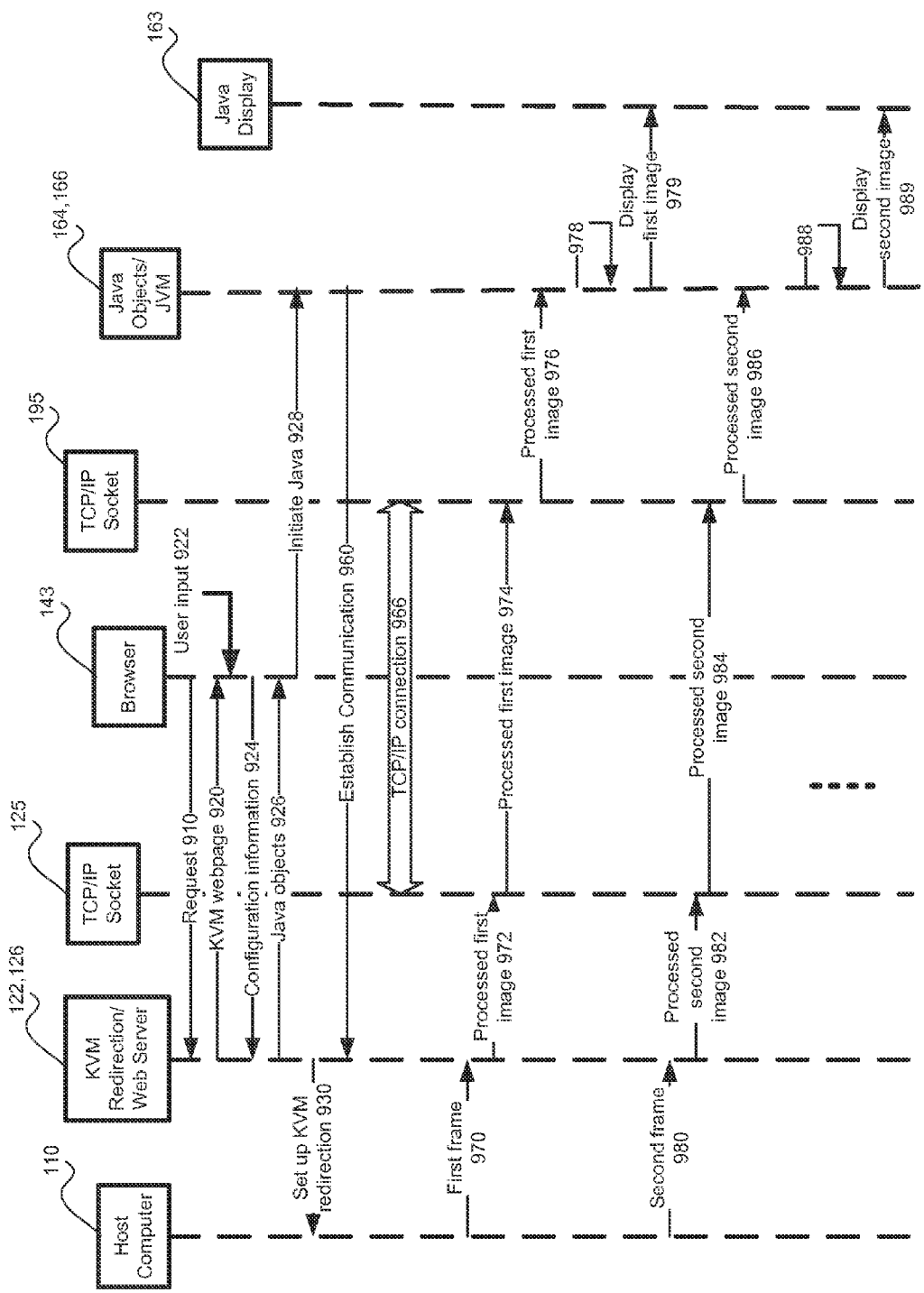
FIG. 9 schematically depicts a process of a video redirection according to another embodiment of the present disclosure.

FIG. 9 illustrates procedures for video redirection utilizing Java objects in accordance with certain embodiments of the present disclosure. At operation 910, the browser program 143 sends a request to the BMC 120 for a KVM redirection webpage via the network. The request may be in the HTTP format. Upon receiving the request for the KVM redirection webpage, at operation 920, the web server 126 of the BMC 120 sends the KVM redirection webpage to the browser program 143. Thus, the browser program 143 may display the KVM redirection webpage to a user, allowing the user of the computing device 140 to input or select the configuration information for the KVM redirection module 122 of the BMC 120 at operation 922. The configuration information of the KVM redirection module may include redirection image resolution information, redirection image refreshing rate information, machine and network settings, authentication settings, and the other information for the KVM redirection. Then, at operation 924, the browser program 143 sends the configuration information, for example using HTTP protocol, to the web server 126 of the BMC 120. The web server 126 accordingly sends the configuration information to the KVM redirection module 122. The browser program 143 also requests Java objects from the web server 126. Upon receiving the configuration information, at procedure 926, the web server 126, if necessary, configures the Java objects 164, and then sends the Java objects 164 and a session token to the browser program 143. Upon receiving the Java objects 164, at procedure 928, the browser program 143 initiates Java objects 164 on the JVM 166 and passes the session token to the Java objects 164.

In the meantime, at operation 930, the BMC sets up the KVM redirection module 122 accordingly. The KVM redirection module 122 can establish a connection with the redirection controller 118 of the host computer 110.

At operation 960, the Java objects 164 initiates a communication with the KVM redirection module 122 using the session token. At operation 966, a TCP/IP connection between the TCP/IP socket module 195 of the computing device 140 and the TCP/IP socket module 125 of the BMC 120 is established.

Once the TCP/IP connection is established, the BMC 120 may start redirecting video output from the host computer 110 to the Java objects 164 through the TCP/IP connection. Specifically, at operation 970, the KVM redirection module receives the first video frame, or Frame 1, from the host computer 110. The KVM redirection module can process (i.e., encode and compress) the first video frame to generate a processed first redirection image. At operation 972, the KVM redirection module 122 sends the processed first redirection image to the TCP/IP socket module 125. At operation 974, the TCP/IP socket module 125 sends the processed first redirection image to the TCP/IP socket module 195 of the computing device 140 through the TCP/IP connection. At operation 976, the TCP/IP socket module 195 sends the first compressed image to the Java objects 164. At operation 978, the Java objects 164 decompress the compressed image. At operation 979, the Java objects display the decompressed image at the Java display module 163.

Subsequently, at operation 980, the KVM redirection module 122 receives a second video frame from the host computer 110. The KVM redirection module 122 then processes (i.e., encodes and compresses) the second video frame and generates a processed second redirection image accordingly. At operation 982, the KVM redirection module sends the processed second redirection image to the TCP/IP socket module 125. At operation 984, the TCP/IP socket module 125 sends the processed second redirection image to the TCP/IP socket module 195 through the TCP/IP connection. At operation 986, the TCP/IP socket module 195 sends the processed second redirection image to the Java objects 164. At operation 988, the Java objects 164 decompress and decode the processed second redirection image, and generate a second image for display. At operation 989, the Java objects 164 display the second image on the Java display module 163.

Referring back to FIG. 4, in certain embodiments, input redirection, including the keyboard and mouse redirection, is concurrently performed with the video redirection. The browser program 143 can receive input signals from an input device such as a keyboard 148, a mouse 149, and a touch panel. The browser program 143 can send input data through the Web Socket connection 150 to the Web Socket 124 of the BMC 120. When the Web Socket 124 of the BMC 120 receives the input data, the Web Socket 124 passes the input data to the web server 126, which can process the input data to retrieve keyboard and mouse input. The web server 126 sends keyboard and mouse input to the KVM redirection module 122. If necessary, the KVM redirection module 122 can convert the keyboard and mouse input into formats that are used by the host computer 110 and then sends the input to the I/O controller 116. In this manner, the host computer 110 perceives the input originated from the browser program 143 as the input from a local input device.

The browser program 143, utilizing the operating system 144, can generate input events that represent input from the keyboard 148 and the mouse 149 directed to the browser program 143. For example, from the keyboard 148, a keyboard action occurs when a key is pressed down. Some keyboard actions may involve a combination of keys being pressed down at the same time. Such keyboard actions generally relate to certain function keys on the keyboard 148, such as the Ctrl key, the Atl key or the Shift key, which are supposed to work in combination with other keys. In such actions, the combination generates a different key input from each separate key input. Each keyboard action generates corresponding input data, which may include a character code or other representative value corresponding to the keyboard event.

A mouse can perform a variety of different actions, such as positioning the mouse cursor over a certain area, moving the mouse cursor, rolling the mouse wheel, and clicking (single click or double click) the mouse buttons. In some cases, the actions can be combined, such as clicking the mouse button when the mouse cursor is positioned in a certain area, or "dragging" the mouse, i.e., clicking the mouse button and moving the mouse cursor without releasing the button. Generally, the mouse events may be categorized into types such as click events, drag events, and motion events.

JavaScript provides functions and event objects corresponding to these mouse and keyboard actions. For example, a click action may involve a mousedown event and a mouseup event, which respectively refer to an action of the mouse button being pressed down and an action of the pressed mouse button being released. A motion action may involve a mousemove event, which refers to moving the mouse cursor from one position to another. A drag action is a combination of the mousedown event, the mousemove event, and the mouseup event. Examples of other JavaScript functions and events related to mouse events may include a mouseover event, which involves moving the mouse cursor over a pre-defined area on the screen, and a mouseenter event, which involves moving the mouse cursor into the pre-defined area on the screen. JavaScript also provides a getMousePos( ) function to be used in combination with the mousemove event. Each mouse event can include multiple parameters. For example, when a mousedown event occurs, the event generates a code representing the mousedown event, and coordinate parameters representing the current position of the mouse cursor where the mousedown event occurs.

In certain embodiments, the KVM redirection webpage captures the position of a mouse event when that event occurs on the canvas 160 or the Java display module 163. For example, the redirection image displayed on the canvas 160 of the browser program 143 can show a user interface output by the host computer 110. A user can use a mouse of the computer device 140 to click a button of the user interface shown on the canvas. The redirection webpage can have JavaScript routines that detect the position of the mouse events and the generated coordinates of the mouse events relative to the canvas 160 or the Java display module 163. Where the resolution of the canvas 160 or the Java display module 163 has a one-to-one relationship with the video frame output by the video controller 117 of the host computer 110, these browser coordinates also indicate the desired position of the redirected mouse event on the host computer 110. In other situations, the web server 126 can convert the browser coordinates received from the browser program 143 to video frame coordinates on the host computer 110, in order to correctly indicate the desired position of the redirected mouse event on the host computer 110.

For example, referring back to FIG. 5, when canvas 160 of the browser program 140 displays the redirection image 159, the user of the computing device 140 may use the mouse to click at a position 180 on the canvas. Thus, the browser program 143 may use the JavaScript including the mousedown event and the getMousePos( ) function to obtain the coordinate parameters of the mouse click position 180, and sends the mouse-click-event data to the BMC 120. Subsequently, the BMC 120, if necessary, converts the mouse-click-event data to a format used by the host computer 110, and sends the event data to the input controller 116 of the host computer 110.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present disclosure is defined by the appended claims rather than the foregoing description and the exemplary embodiments described therein.

What is claimed is:

1. A method of performing web-based keyboard, video and mouse (KVM) redirection implemented by a baseboard management controller (BMC), comprising:

receiving, at a BMC, first and second video frames redirected from a host computer, wherein the BMC performs a management function of the host computer;

generating a webpage at a web server of the BMC and sending the webpage to a browser program running on a computing device in a network, wherein the webpage is programmed to instruct the browser program to initiate a drawable area and to establish a Web Socket connection with the web server;

generating a processed image representing the second video frame;

establishing a Web Socket connection between the web server and the browser program; and sending the processed image to the browser program through the Web Socket connection.

2. The method of claim 1, wherein the generating a processed image comprises comparing, at the BMC, the second video frame with the first video frame to determine a first pixel of the second video frame, wherein the first pixel has a pixel value that differs from a pixel value of a corresponding pixel of the first video frame;

generating a first tile image and associated tile parameters, the first tile image representing a portion of the second video frame including the first pixel;

wherein the sending the processed image comprises sending the first tile image and the tile parameters to the browser program through the Web Socket connection; and wherein the webpage is programmed to instruct the browser program to patch the first tile image on the drawable area at a position indicated by the tile parameters.

3. The method of claim 2, comprising:

generating a redirection image representing the first video frame; and sending the redirection image to the browser program through the Web Socket connection, wherein the webpage is programmed to display the redirection image on the drawable area.

4. The method of claim 3, wherein the drawable area is a canvas defined by HTML 5, wherein the webpage is programmed to instruct the browser program to display the redirection image on the canvas and to patch the first tile image on the displayed redirection image.

5. The method of claim 3, comprising:

dividing the second video frame into a plurality of tiles;

comparing a pixel value of each pixel in the second video frame with a pixel value of a corresponding pixel in the first video frame;

determining a plurality of changed pixels in the second video frame, wherein the pixel value of each of the changed pixels differs from the pixel value of the corresponding pixel of the each changed pixel and in the first video frame;

determining a plurality of changed tiles, wherein each of the changed tiles contains at least one of the changed pixels;

generating a plurality of changed tile images, wherein each of the changed tile images represents a respective one of the changed tiles; and sending the plurality of changed tile images to the browser program through the Web Socket connection, wherein the webpage is programmed to instruct the browser program to patch the changed tile images on the drawing area.

6. The method of claim 5, comprising:

determining a position of each of the changed tiles on the second video frame; and generating tile parameters for each of the changed tile images based on the position of a respective changed tile represented by the each changed tile image, wherein the webpage is programmed to instruct the browser program to patch the each changed tile image on the drawing area at a position indicated by the tile parameters.

7. The method of claim 6, wherein the tile parameters include coordinates indicating a position on the drawable area, a width of the each changed tile image, and a height of the each changed tile image.

8. The method of claim 1, wherein the webpage is programmed to instruct the browser program to capture a first event occurred on the drawable area and to send event data of the first event to the web server, the first event is a mouse event or a keyboard event; the method comprising:

receiving the event data from the browser program through the Web Socket connection;

generating input data compatible with the host computer and representing the event data; and sending the input data to an input controller of the host computer.

9. The method of claim 8, wherein the first event is a mouse event, wherein the event data indicate an event position on the drawable area where the event occurred; the method comprising:

determining position coordinates of the host computer based on the event position; and generating the input data representing the mouse event and the position coordinates.

10. The method of claim 8, wherein the first event is a keyboard event, wherein the event data indicate a keystroke; the method comprising:

generating the input data representing the keystroke.

11. The method of claim 1, comprising:

generating, at the BMC, a predicted value of a given pixel of the second video frame based on pixel values of a plurality of surrounding pixels that surround the given pixel and pixel values of the pixels in the first video frame that correspond to the given pixel and the surrounding pixels; and selectively replacing a pixel value of the given pixel with the predicted value based on a lossy or lossless requirement to generate an encoded image.

12. The method of claim 11, comprising: compressing the encoded image at the web server to generate the processed image, wherein the webpage is programmed to instruct the browser program to call JavaScript routines to decompress and decode the processed image and to display the decompressed and decoded image at the drawable area.

13. A method of performing web-based keyboard, video and mouse (KVM) redirection implemented by a baseboard management controller (BMC), comprising:

receiving, at a BMC, first and second video frames redirected from a host computer, wherein the BMC performs a management function of the host computer;

generating a webpage at a web server of the BMC and sending the webpage to a browser program running on a computing device in a network;

generating a processed image representing the second video frame;

storing Java objects at the web server, wherein the webpage is programed to instruct the browser program to download the Java objects, wherein the Java objects define a Java display;

establishing a network connection between the BMC and the Java objects downloaded to and executed on a Java virtual machine at the computing device; and sending the processed image to the executed Java objects.

14. The method of claim 13, comprising:
generating, at the BMC, a predicted value of a given of the second video frame pixel based on pixel values of a plurality of surrounding pixels that surround the given pixel and values of the pixels in the first video frame that correspond to the given pixel and the surrounding pixels; and
selectively replacing a pixel value of the given pixel with the predicted value based on a lossy or lossless requirement to generate an encoded image.

15. The method of claim 14, comprising:
compressing the encoded image at the web server to generate the processed image;
decompressing and decoding the processed image at the executed Java objects; and
displaying the decompressed and decoded image on the Java display.

16. A non-transitory computer storage medium having computer-executable instructions stored thereon which, when executed by a processor of a baseboard management controller (BMC) computer, cause the processor to:
receive first and second video frames redirected from the host computer, wherein the BMC performs a management function of the host computer;
generate a webpage at a web server and send the webpage to a browser program running on a computing device in a network, wherein the webpage is programmed to instruct the browser program to initiate a drawable area and to establish a Web Socket connection with the web server;
generate a processed image representing the second video frame;
establish a Web Socket connection between the web server and the browser program; and
send the processed image to the browser program through the Web Socket connection.

17. The non-transitory computer storage medium of claim 16, wherein the instructions, when executed, cause the processor to:
compare the second video frame with the first video frame to determine a first pixel of the second video frame, wherein the first pixel has a pixel value that differs from a pixel value of a corresponding pixel of the first video frame;
generate a first tile image and associated tile parameters, the first tile image representing a portion of the second video frame including the first pixel; and
sending the first tile image and the tile parameters to the browser program through the Web Socket connection;
wherein the webpage is programmed to instruct the browser program to patch the first tile image on the drawable area at a position indicated by the tile parameters.

18. The non-transitory computer storage medium of claim 17, wherein the instructions, when executed, cause the processor to:
generate a redirection image representing the first video frame; and
send the redirection image to the browser program through the Web Socket connection,
wherein the webpage is programmed to display the redirection image on the drawable area;
wherein the drawable area is a canvas defined by HTML 5, and the webpage is programmed to instruct the browser program to display the redirection image on the canvas and to patch the first tile image on the displayed redirection image.

19. The non-transitory computer storage medium of claim 18, wherein the instructions, when executed, cause the processor to:
divide the second video frame into a plurality of tiles;
compare a pixel value of each pixel in the second video frame with a pixel value of a corresponding pixel in the first video frame;
determine a plurality of changed pixels in the second video frame, wherein the pixel value of each of the changed pixels differs from the pixel value of the corresponding pixel of the each changed pixel and in the first video frame;
determine a plurality of changed tiles, wherein each of the changed tiles contains at least one of the changed pixels;
generate a plurality of changed tile images, wherein each of the changed tile images represents a respective one of the changed tiles; and
send the plurality of changed tile images to the browser program through the Web Socket connection, wherein the webpage is programmed to instruct the browser program to patch the changed tile images on the drawing area.

20. The non-transitory computer storage medium of claim 17, wherein the instructions, when executed, cause the processor to:
determine a position of each of the changed tiles on the second video frame; and
generate tile parameters for each of the changed tile images based on the position of a respective changed tile represented by the each changed tile image, wherein the webpage is programmed to instruct the browser program to patch the each changed tile image on the drawing area at a position indicated by the tile parameters,
wherein the tile parameters include coordinates indicating a position on the drawable area, a width of the each changed tile image, and a height of the each changed tile image.

21. The non-transitory computer storage medium of claim 20, wherein the webpage is programmed to instruct the browser program to capture a first event occurred on the drawable area and to send event data of the first event to the web server, wherein the first event is a mouse event or a keyboard event, and wherein the instructions, when executed, cause the processor to:
receive the event data from the browser program through the Web Socket connection;
generate input data compatible with the host computer and representing the event data; and
send the input data to an input controller of the host computer.

22. The non-transitory computer storage medium of claim 21, wherein the first event is a mouse event, wherein the event data indicate an event position on the drawable area where the event occurred, and wherein the instructions, when executed, cause the processor to:
determine position coordinates of the host computer based on the event position; and
generate the input data representing the mouse event and the position coordinates.

23. The non-transitory computer storage medium of claim 21, wherein the first event is a keyboard event, wherein the event data indicate a keystroke, and wherein the instructions, when executed, cause the processor to generate the input data representing the keystroke.

24. The non-transitory computer storage medium of claim 16, wherein the instructions, when executed, cause the processor to:

generate, at the BMC, a predicted value of a given pixel of the second video frame based on pixel values of a plurality of surrounding pixels that surround the given pixel and pixel values of the pixels in the first video frame that correspond to the given pixel and the surrounding pixels; and selectively replace a pixel value of the given pixel with the predicted value based on a lossy or lossless requirement to generate an encoded image.

25. The non-transitory computer storage medium of claim 24, wherein the instructions, when executed, cause the processor to compress the encoded image at the web server to generate the processed image, wherein the webpage is programmed to instruct the browser program to call JavaScript routines to decompress and decode the processed image and to display the decompressed and decoded image at the drawable area.

* * * * *